Feb. 2, 1943.    F. H. WILLIS    2,309,879
STEREOSCOPIC MOTION PICTURE
Filed May 17, 1940    4 Sheets-Sheet 1
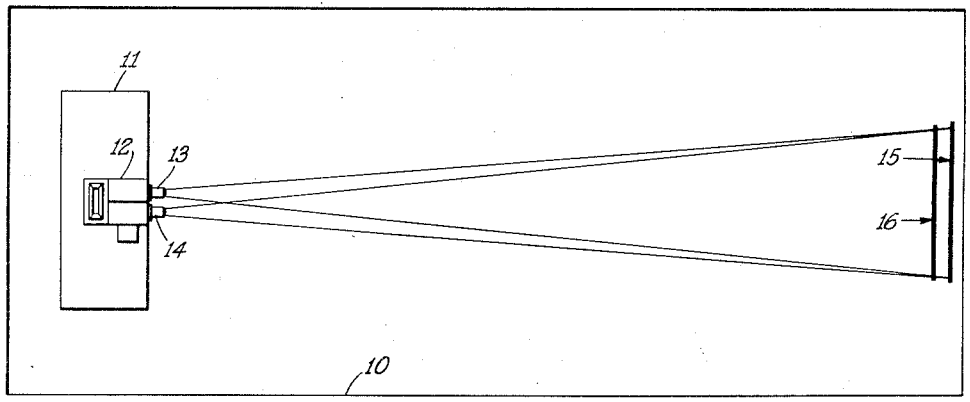
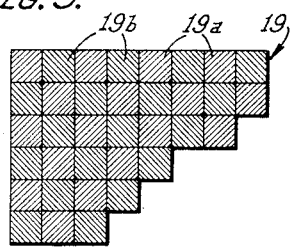
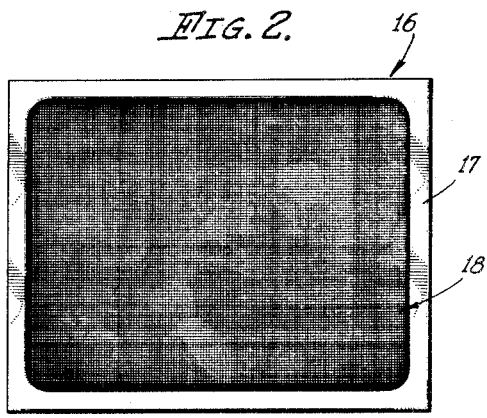
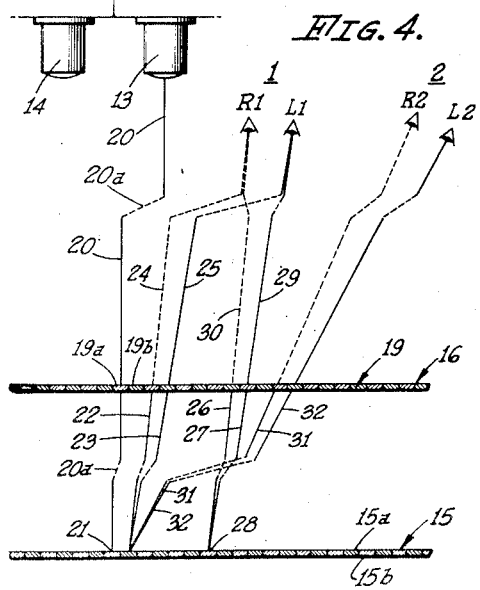
FLOYD H. WILLIS
INVENTOR
BY
Harold W. Mattingly
ATTORNEY Feb. 2, 1943. F. H. WILLIS 2,309,879
STEREOSCOPIC MOTION PICTURE
Filed May 17, 1940 4 Sheets-Sheet 2
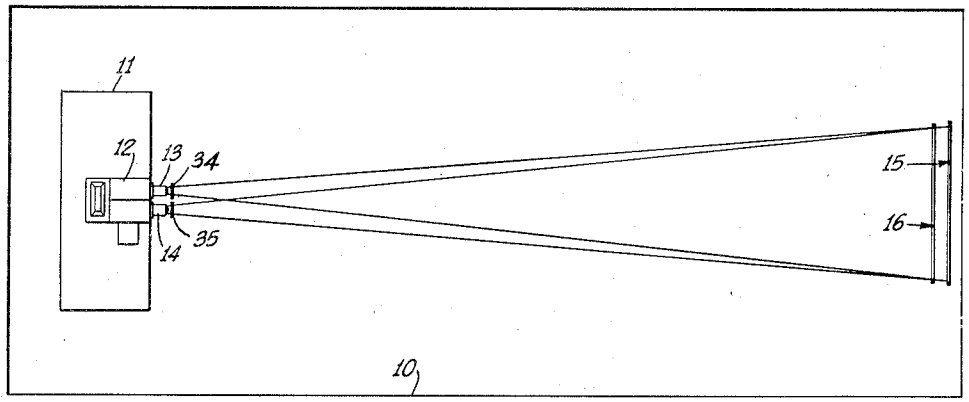
FIG. 6.
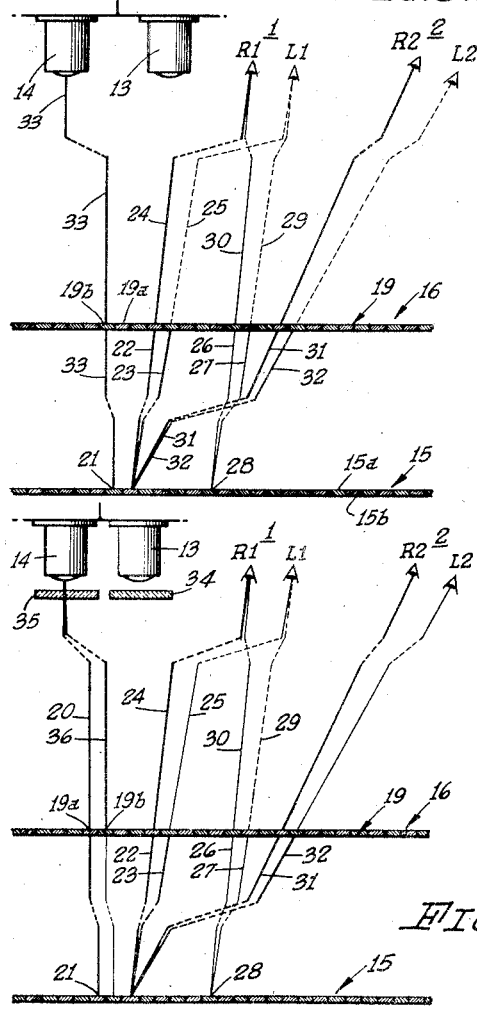
FIG. 5.
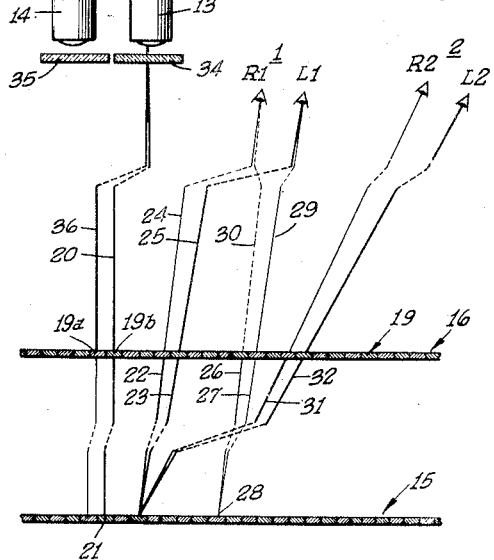
FIG. 7.
FIG. 8.
FLOYD H. WILLIS
INVENTOR
BY
ATTORNEY Feb. 2, 1943.   F. H. WILLIS   2,309,879
STEREOSCOPIC MOTION PICTURE
Filed May 17, 1940   4 Sheets-Sheet 3
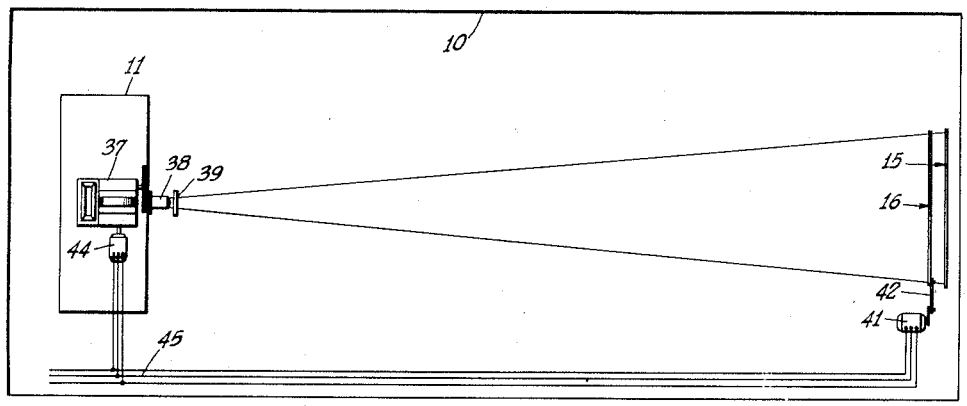
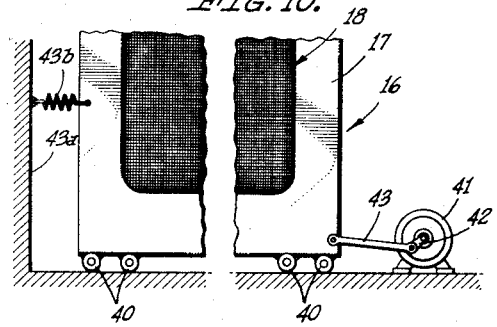
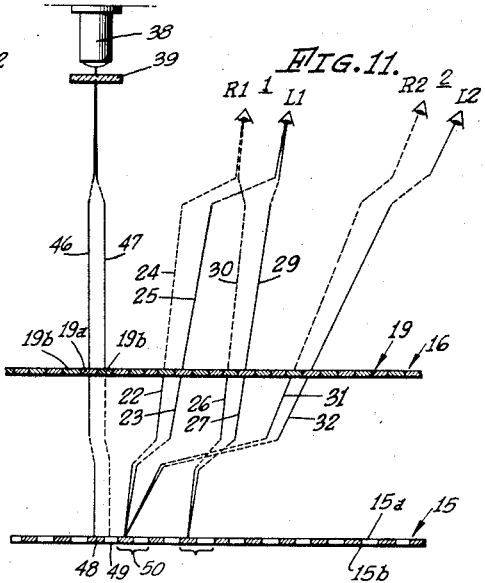
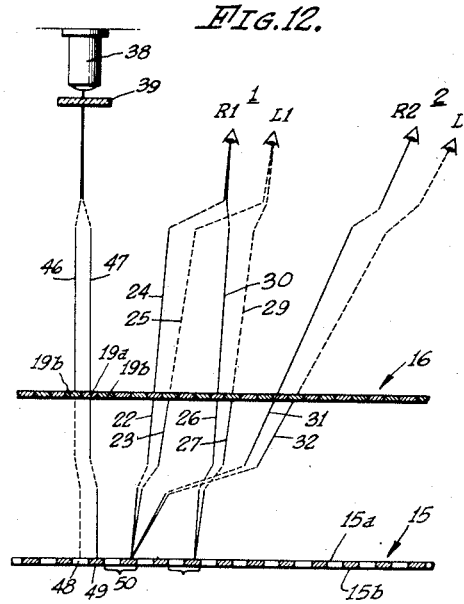
Floyd H. Willis
INVENTOR
BY
ATTORNEY Feb. 2, 1943.   F. H. WILLIS   2,309,879
STEREOSCOPIC MOTION PICTURE
Filed May 17, 1940   4 Sheets-Sheet 4
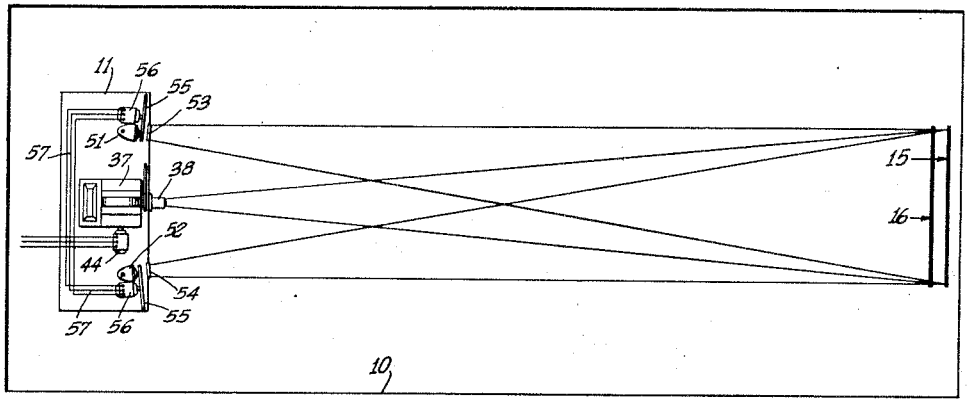
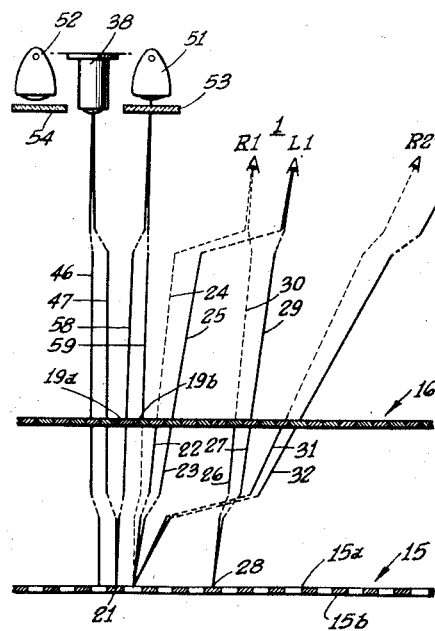
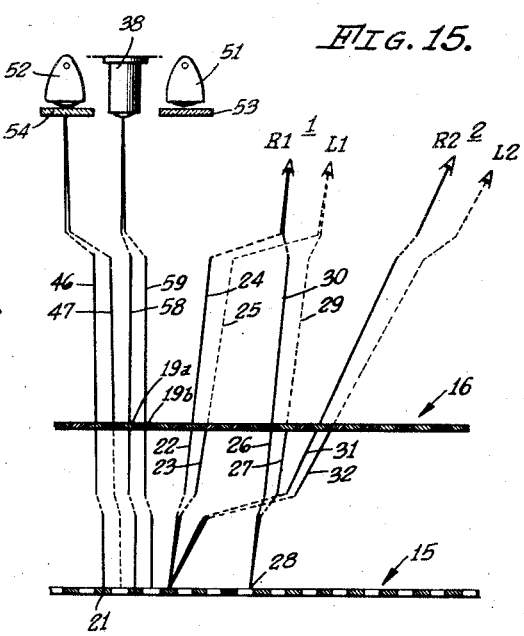
Floyd H. Willis
INVENTOR
By Harold W. Mattingly
ATTORNEY Patented Feb. 2, 1943

2,309,879

UNITED STATES PATENT OFFICE 2,309,879

STEREOSCOPIC MOTION PICTURE

Floyd H. Willis, Los Angeles, Calif.

Application May 17, 1940, Serial No. 335,734

6 Claims. (Cl. 88—16.6)

My invention relates to stereoscopic motion pictures and has particular reference to a method and apparatus for obtaining a stereoscopic projection of motion pictures without requiring an observer thereof to wear auxiliary viewing devices.

Many attempts have been made in the past to provide a means whereby a motion picture theater audience would obtain an impression of depth or third dimension in the projected pictures.

These attempts have generally been directed to providing a method or apparatus whereby the vision of each of an observer's eyes is limited to different projected images, these different projected images representing different viewpoint aspects of the scene photographed.

The basic principle upon which this line of endeavor is based is well illustrated by the well known stereoscope wherein a stereoscopically related pair of pictures is mounted in a device in such position that one of these pictures is seen with the left eye only and the other of these pictures is seen with the right eye only.

In attempting to adapt this broad principle to the projection of motion pictures a number of inventions have been made requiring each observer to employ some sort of viewing device which, because of the character of light used to project the pictures or because the mechanical mechanisms associated with the viewing devices are operated in synchronism with the motion picture projector, served to actually limit the vision of each of the observer's eyes to that one of the projected stereoscopic aspects which should be associated with that eye. While these devices produced a stereoscopic impression of undeniably high quality, they are not susceptible to ready acceptance by the motion picture industry for the reason that it has been found difficult to provide such auxiliary viewing devices for each and every member of a large motion picture theater audience. Furthermore, the cost of maintaining such an excessively large number of auxiliary devices has been found to be prohibitive.

In order to overcome this disadvantage other inventions have been directed to the making of projection screens of such type that when the motion pictures are projected thereon, the vision of an observer's eyes will be limited as required in order to obtain the stereoscopic impression. Thus far no one has succeeded in devising a screen of this character which will permit the desired stereoscopic impression to be obtained by an observer irrespective of where that observer may be positioned in the theater audience, present screens being operative only when the observer is positioned substantially along the optical axis of the screen. Obviously these screens are not adapted for use in ordinary motion picture theaters for the reason that but a very small percentage of the audience would obtain the desired stereoscopic impression.

In order for a motion picture apparatus of this character to be commercially acceptable it must be so constructed as to permit the ready installation thereof in existing motion picture theaters without requiring any extensive modifications of the present projection apparatus installed in those theaters. Furthermore, the equipment must operate in such manner as to provide a stereoscopic impression of the desired quality to all of the observers in the theater irrespective of where they may be seated.

It is accordingly an object of my invention to provide a method and apparatus for obtaining a stereoscopic projection of motion pictures by limiting the vision of each of an observer's eyes to different projected stereoscopic aspects without requiring the use of auxiliary viewing devices.

It is another object of my invention to provide a method and apparatus of the character set forth in the preceding paragraph which limits the vision of each of an observer's eyes in the manner defined even though such observer may be located at a considerable distance from the axis of the projection screen.

It is a still further object of my invention to provide a filter for use before an ordinary motion picture projection screen which includes a means for limiting the direction in which light is reflected from the screen so that one of an observer's eyes will be permitted to see the picture which is projected on the screen, whereas the other of the observer's eyes will not be so permitted.

It is an additional object of my invention to provide a filter of the character set forth in the preceding paragraph which comprises a plurality of transparent light polarizing elements arranged in an alternated pattern as regards the direction of their axes of polarization, whereby one of an observer's eyes will be permitted to see through the polarizing elements to observe the picture projected on the screen, whereas no light from the screen will reach the other eye of that observer.

It is also an object of my invention to provide a filter of the character set forth in the preceding paragraph in which the area of each of said elements is made sufficiently small to approximate the size of the projected image of each silver grain in the motion picture film.

It is a still further object of my invention to provide a filter of the character set forth hereinbefore, together with a light polarizing means interposed between the projector and the filter and a means for moving the filter from side to side in synchronism with the operation of the motion picture projector.

It is still an additional object of my invention to provide a filter of the character set forth in the preceding paragraphs, together with a means for alternately projecting upon the projection screen from different locations and independently of the motion picture projector polarized light which is polarized in opposite directions.

Other objects and advantages of my invention will be apparent from a study of the following specifications, read in connection with the accompanying drawings, wherein:

Fig. 1 is a diagrammatic representation of a motion picture projection auditorium equipped with one form of stereoscopic apparatus functioning in accordance with the method of my invention;

Fig. 2 is an elevational view illustrating the appearance of one form of screen or filter which may be employed with the apparatus indicated in Fig. 1;

Fig. 3 is an enlarged fragmentary elevation of the surface of the screen illustrated in Fig. 2 and showing the manner in which the filter elements are alternately arranged as regards the disposition of their axes of polarization;

Fig. 4 is a schematic representation of the operation of the form of the invention which is illustrated in Fig. 1 during the time one frame of a motion picture film is being projected from one location;

Fig. 5 is a diagram similar to Fig. 4 but illustrating the operation when the projection is accomplished from another point;

Fig. 6 is a diagrammatic view similar to Fig. 1 but illustrating a modified form of my invention;

Figs. 7 and 8 are diagrammatic representations similar to Figs. 4 and 5 but illustrating the operation of that form of the invention which is shown in Fig. 6;

Fig. 9 is a schematic representation of still another embodiment of my invention;

Fig. 10 is a fragmentary elevational view illustrating a form of device which may be employed for laterally moving the filter illustrated in Fig. 2 in the manner prescribed by the embodiment of my invention which is illustrated in Fig. 9;

Figs. 11 and 12 are diagrammatic illustrations showing the principle of operation of the form of the invention illustrated in Fig. 9;

Fig. 13 is a schematic drawing similar to Figs. 1 and 6 but illustrating another form which my invention may take; and Figs. 14 and 15 are diagrams illustrating the operation of the apparatus shown in Fig. 13.

I have illustrated in Figs. 1 through 5 one form of my invention which may be arranged in a motion picture theater auditorium in the manner indicated in Fig. 1 wherein the line 10 represents the confines of such auditorium and the rectangle 11 indicates a projection booth. Within the booth 11 I provide a motion picture projector 12 adapted to project, as by means of objective lenses 13 and 14, motion pictures from two separate points spaced from each other upon a single motion picture projection screen 15 which may be of conventional or standard construction.

The motion picture projector 12 may be arranged to project images from a single positive film strip which carries images in two separate viewpoint aspects of the scene being photographed, (these separate aspect images being arranged alternately along the length of the film) and may include means for projecting one of these aspects through the objective element 13 and the other of these aspects through the objective element 14. If desired, the projector 12 may be arranged to project either alternately or simultaneously the images carried by separate positive film strips, one of the film strips which is projected through the objective 13 carrying images of the scene photographed in one viewpoint aspect, while the film which is projected through the objective 14 carries images of the same scene which is photographed but in a different viewpoint aspect.

Between the screen 15 and the projector 12 I dispose another transparent screen or filter 16 which is preferably constructed along the lines illustrated in Figs. 2 and 3. This screen serves, in a manner to be described hereinafter, to limit the vision of each observer of the screen 15 irrespective of where he may be located within the auditorium 10 in such manner that but one eye will see the images which are projected through the objective lens 13 while the other eye will be permitted to see only those images which are projected through the objective 14.

As is illustrated in Figs. 2 and 3, the filter 16 preferably includes a frame 17 within which is defined a filter area 18, the area of the filter 18 being somewhat larger than the area of the screen 15 so that regardless of where an observer may be positioned within the auditorium 10, he must of necessity look through the filter area 18 in order to see the picture which is projected upon the projection screen 15.

The filter area 18 comprises a transparent filter medium made up of a plurality of light polarizing elements 19. These elements are illustrated in Fig. 3 as being square or rectangular in shape, but it is to be understood that other shapes, such as diamonds, triangles, hexagons, and the like may be found to be equally suitable.

The polarizing elements 19 are preferably arranged in an alternated or checkerboard pattern as regards the disposition of their axes of polarization; as for example, by disposing each of the light polarizing elements indicated by 19a in Fig. 3 in such direction that the light transmitted therethrough may be polarized in a direction extending upwardly and to the right at an angle of forty-five degrees as indicated by the shading on these elements in the drawings, whereas, each alternate one of the elements (identified by reference character 19b in Fig. 3) is arranged to polarize the light transmitted therethrough in a direction extended upwardly and to the left at an angle of forty-five degrees. Other angular dispositions of the light polarizing elements may be used, as desired, as long as the axis of polarization of alternate ones of the elements is maintained at substantially right angles to each other.

I have illustrated in Fig. 4 the manner in which the above described apparatus operates to limit an observer's vision to one eye as regards the projection of an image through the objective lens 13 and in Fig. 5 I have illustrated the manner in which an observer's vision is limited to the opposite eye as regards the viewing of an image projected through the projection lens 14. In these figures each of the light polarizing elements 19 of the filter 16 is represented by means of small rectangles and the angular disposition of the cross sectioning of these rectangles is intended to indicate the relative angular disposition of the axes of polarization of the light polarizing elements. Similarly, the standard motion picture projection screen 15 is indicated by means of a pair of parallel lines 15a and 15b which are divided into small rectangular areas which are angularly cross hatched to indicate the direction of polarization of light which is received on the surface of the screen 15 as projected through the filter 16.

I have indicated in Fig. 4 by means of a line 20 the path followed by one ray of the light which is projected through the projection lens 13. Fig. 4 has been greatly foreshortened and in order to reproduce the relative angular relationships between the various lines of sight and between the various light rays, the lines representative of such lines of sight and light rays have been offset and interconnected by means of dotted lines, such as dotted lines 20a. It will be understood, therefore, that the line 20 although broken and having portions thereof offset from the other portions, is intended to represent the light ray which is projected in a straight line from the objective element 13, through the filter 16 to impinge upon the screen 15 at the point indicated by reference character 21.

It will be observed that the light ray 20 projected upon the filter 16 will pass through one of the light polarizing elements 19 which is disposed in a position corresponding to an element 19a and that this ray of light will be polarized thereby so as to produce upon the screen 15 a spot of light at the point 21 which is polarized in a corresponding direction. It will be readily apparent that since the light which is transmitted from the projection lens 13 will be directed over the entire area of the screen 15, there will be produced upon the surface of that screen light which is polarized in different directions in a checkerboard pattern conforming to the pattern of the filter 16.

I have indicated in Fig. 4 by means of reference characters 22 and 23 a pair of rays of light which are reflected from the same point on the surface of the screen 15, the ray 22 striking an element 19 of the filter 16 which is polarized in the direction opposite to that of the light ray 22, whereas, the light ray 23 is illustrated as striking an element 19 which is polarized in the same direction as the polarization of the ray 23. As is well known to those skilled in the art, when light which is polarized in one direction strikes a transparent light polarizing medium which is so disposed as to place the axis of polarization thereof at right angles to the direction of polarization of the light, the transparent medium is rendered opaque as regards that light and will not transmit any light through the medium.

It will therefore be apparent that the ray 22 (which, if it were allowed to pass through the filter 16 would continue a course indicated by the dotted line 24 to reach a right eye R1 of an observer 1 located at some point in the auditorium) is stopped where it strikes the screen 15 because of the right angle disposition of the axis of polarization of the screen element relative to the light. The light ray 23, however, striking a light polarizing element which is disposed in the same direction as the polarization of the light ray 23 will pass through the screen unimpeded to follow a course indicated by the line 25 to reach the left eye L1 of the observer 1. It will thus be apparent that as to that portion of the picture which is represented by the light reflected along the paths 24 and 25 and comprising the light rays 22 and 23, the vision of the observer 1 will be so limited as to permit his left eye L1 to see the image, whereas, the right eye R1 will not be so permitted.

This condition obtains irrespective of the point to which an observer's attention may be directed. Suppose, for example, light rays 26 and 27 were reflected from a point 28 on the screen upon which the light which is received through the filter 16 is polarized oppositely to that described in connection with light rays 22 and 23 and that the rays 26 and 27 would, if allowed to pass through the filter 16 unimpeded, reach the right and left eyes R1 and L1, respectively, of the observer 1.

It will be observed that the light ray 27 passes through an element of the filter 16 which is polarized in the same direction as the polarization of the light ray so as to permit the ray to follow a course 29 and reach the left eye L1 of the observer 1. It will also be observed that the one ray 26 strikes an element of the screen which is oppositely polarized so that the ray is stopped at this point instead of being transmitted along the dotted line 30 to the right eye R1 of the observer. It follows, therefore, that the vision of the observer 1 is limited to his left eye as regards an image which is projected from the projection lens 13 irrespective of the point on the screen 15 to which he may direct his attention.

The above described condition also obtains irrespective of where the observer may be positioned in the auditorium. This is illustrated in Fig. 4 by light rays 31 and 32 which are reflected from the same point as the light rays 22 and 23 but in a direction to reach the right and left eyes R2 and L2, respectively, of an observer 2 located at a different place in the auditorium than that occupied by observer 1. The light ray 32 is indicated in Fig. 4 as striking an element of the filter 16 which is polarized in the same direction as is the light forming the ray 32 so that the ray 32 will continue through the filter 16 unimpeded and reach the left eye L2 of the observer 2. The other light ray 31, however, will strike an element 19 of the filter 16 which is oppositely polarized so as to be stopped thereby and be prevented from reaching the right eye R2 of the observer 2. It will thus be seen that irrespective of where an observer may be positioned within the confines of the auditorium 10 and irrespective of the portion of the screen to which he may be directing his attention, his vision will be limited in such manner that one eye is permitted to see the picture which is projected upon the screen 15 from the objective 13 whereas the other eye will not be permitted to view this picture.

It will be apparent from the foregoing that in order for the above described condition to obtain, it is necessary that the filter 16 be positioned before the screen 15 a distance such that the angle subtended by the width of one of the elements 19 relative to an arbitrarily selected point on the screen 15 will be substantially equal to the angle subtended by the eyes of an observer relative to that same arbitrary point.

While it is obviously impossible to so adjust the location of the filter 16 as to accurately and precisely produce this exact angular relationship irrespective of where an observer may be positioned within the auditorium 10, it has been found that by making the screen elements 19 very small, a compromise condition may be obtained wherein the differences between the desired angular relationships, as above described, and the actual angular relationships which are obtained may be made so small as to permit completely satisfactory operation of the device irrespective of where in the theater an observer may be located and irrespective of the portion of the screen to which his attention may be directed. The precise compromise arrangement which affords the best results is best determined by experiment, it being necessary only to dispose the filter 16 an arbitrarily selected distance before the screen 15 and place the apparatus in operation and then observe the effect of moving the filter closer to and farther away from the screen 15.

I have illustrated in Fig. 5 the manner in which the observer's vision is limited so as to permit the viewing of the image which is projected through the objective lens 14 to be accomplished by means of the opposite eye from that which was permitted to observe the picture projected through the objective lens 13. Reference to Fig. 5 will show that a light ray 33 extended from the objective element 14 to the same point 21 to which the aforementioned light ray 20 was extended, will pass through the filter 16 at a point disposed to the left of the point of passage of the light ray 20 by a distance equal to the width of the light polarizing elements 19 so that the light ray 33 is caused to pass through an element polarized in the direction represented by the elements 19b. This causes the light which is projected upon the spot 21 to be polarized in a direction opposite to the light which is projected upon this point from the objective element 13.

It is therefore clearly apparent that the pattern of polarized light which is produced on the screen 15 by the shifting of the line of projection from the objective element 13 to the objective element 14 will be offset by a distance equal to the dimensions of the light polarizing elements and that the direction of polarization of the reflected light rays 22—23, 26—27, and 31—32 will be opposite to that described in connection with Fig. 4 so that the rays which, under the conditions illustrated in Fig. 4, were permitted to pass through the filter 16 will, under the conditions illustrated in Fig. 5, be stopped at the filter whereas the other rays will be permitted to pass therethrough.

It will be, therefore, clearly apparent that as illustrated in Fig. 5 the right eyes R1 and R2 of the observers 1 and 2 will be permitted to view the picture which is projected from the objective element 14.

From the foregoing it will be clearly apparent that if one stereoscopic aspect is projected through the objective element 13 and a different stereoscopic aspect of the same natural scene is projected through the objective element 14, an observer's vision will be so limited as to permit the viewing of one of these aspects with one eye only and the viewing of the other of these aspects with the other eye only. It follows that if the aspects are projected alternately in rapid succession as in ordinary motion picture projection, the observer's persistence of vision will cause the impression of having seen both of the aspects simultaneously so as to produce a true impression of stereoscopic vision.

As has been pointed out hereinbefore, the projector may be operated in such manner as to project the aspects alternately from the objective elements 13 and 14 or, if desired, the projector may be operated in such fashion that the two aspects are projected simultaneously from both of the objective elements. In either case a true stereoscopic impression will be imparted to an observer of the screen irrespective of where the observer may be positioned in the theater auditorium or to what portion of the screen his attention may be directed.

I have found that as a light polarizing medium which may be employed for the light polarizing elements 19, a transparent plastic material having the property of polarizing light which is transmitted therethrough and identified by the trade name "Polaroid" is eminently suitable for the purpose. This material may be obtained in various degrees of polarizing ability; that is to say, the material may be obtained having the ability of completely polarizing the light which is transmitted therethrough or other grades of the same material may be obtained which will operate to polarize only a part of the light. These latter grades are, in general, less expensive than are the completely polarizing grades and it is, therefore desirable that the less expensive grades be used for the manufacture of the filter 16, if possible.

I have illustrated in Fig. 6 a modification of the above described invention which permits the use of the less expensive grades of light polarizing medium. This form of the invention is identical in all respects with that described in connection with Fig. 1 with two exceptions; namely, the material which is employed for the filter 16 has only a partial polarizing ability so that only a part of the light which is transmitted through the screen is polarized, and secondly, that there is provided before each of the objective elements 13 and 14 light polarizing filters 34—35 which are disposed in positions at right angles to each other as regards their axes of polarization. These filters are preferably strongly polarized so as to supply the polarizing deficiencies existing in the material employed for the manufacture of the filter 16.

I have illustrated in Figs. 7 and 8 the manner in which this form of the invention operates and comparison with Figs. 4 and 5 will show that the operation is identical with the form of the device illustrated in Fig. 1 with the exception that the pattern of polarized light which is projected on the screen 15 from the motion picture projector is of unbalanced intensity.

As shown in Fig. 7 the light ray 20 which is projected from the objective element 13 to the point 21 on the screen 15 will pass through a light polarizing element of the filter 16 which is disposed with its axis of polarization lying in the same direction as the axis of polarization of the filter 34 so that the ray passes without diminution through the filter 16. An adjacent light ray 36 will, however, strike an element of the screen 19 which is polarized in the opposite direction so as to be diminished in intensity in passing through the filter 16. The contrast which is thus afforded is further enhanced by the reflection of the light back through the filter 16 to the eyes of the observers and the apparatus operates in precisely the manner described in connection with the previously described embodiment of my invention as long as the degree of contrast between the two rays of light is sufficiently great to cause the light which reaches one of the observer's eyes to be below the level of perception as compared with the light which reaches the other of the observer's eyes. This condition is obtained by adjusting the relative degrees of polarization of the filters 34—35 as compared with the material employed in the filter 16 and this relationship is best determined empirically.

If desired, the difficulties attendant upon projecting different stereoscopic aspects of a scene which has been photographed from different projection locations may be obviated by employing an apparatus constructed along the lines illustrated in Figs. 9 and 10. This apparatus includes, as is illustrated in Fig. 9, a standard motion picture projector 37 equipped with but a single projection lens 38 adapted to project through a light polarizing filter 39 pictures upon the filter 16 and screen 15 in alternate fashion as regards the stereoscopic aspects which the pictures represent.

The filter 16 which is disposed before the screen 15 is mounted for side to side reciprocal movement as by employing the construction illustrated in Fig. 10 wherein the frame 17 is illustrated as being supported upon one or more pairs of rollers 40 for movement in a horizontal direction parallel to its surface. Such motion may be imparted to the screen by employing an electric motor 41 upon the shaft of which is affixed a crank 42 connected as by means of a connecting rod 43 to the frame 17 in such manner that rotation of the shaft of the motor 41 will cause the filter frame 17 to be laterally moved. The length of the crank 42 is so adjusted that the amount of movement which is imparted to the filter frame 17 is equal to the width of the light polarizing elements 19 employed therein. By this means the filter 16 is reciprocated in synchronism with the operation of the projector 37 in such manner that the filter will occupy its farthest left position at the time one stereoscopic aspect is being projected through the objective lens 38 and will occupy its extreme right position at the time another stereoscopic aspect is being projected.

The power required to impart this relatively rapid reciprocating movement to the filter 16 may be reduced as by interconnecting the movable filter frame 17 with a stationary object, such as a wall 43a, by means of a tension spring 43b, the spring constant of which is so adjusted as to provide a resonant frequency of the filter 16 equal to the periodicity of the reciprocating movement. This reciprocating movement may be synchronized with the operation of the projector by making the motor 41 of the alternating current synchronous type and by driving the projector 37 by means of a similar synchronous motor 44, the motors 41 and 44 being interconnected as by means of synchronizing tie lines 45.

The manner in which the above described apparatus functions may be clearly observed by having reference to Figs. 11 and 12. I have illustrated diagrammatically in Fig. 11 the relative relationship between the various parts of the apparatus and the paths along which the light is projected during the projection of one of the stereoscopic aspects, as for example, during the time a left eye picture is being projected. Assuming that the lines 46 and 47 represent two light rays selected from the total light which is projected from the objective element 38 upon the screen 15, it will be observed that the ray 46 being polarized by means of the polarizing element 39 and striking an element 19a of the filter 16 which is polarized in the same direction, will pass through the filter unimpeded and impinge upon the screen 15 to produce a spot of polarized light 48 thereon. It will also be observed that the other ray 47 being polarized in the same direction as the ray 46 but striking a filter element 19b which is oppositely polarized, will be stopped at the filter 16 so as to cause a blank spot or unlighted portion 49 to be produced on the screen 15.

It will be thus apparent that there is produced upon the screen 15 a checkerboard pattern of alternate dark and light portions conforming to the checkerboard pattern of the filter 16, and that the lighted portions will all be polarized in the same direction.

Assuming that the attention of the observer 1 is directed to a small area of the screen, such as that embraced by the bracket 50 in Fig. 11, it will be found that the light rays 22 and 23 reflected from the lighted portion of that area will strike the filter 16 in precisely the same manner as that previously described in connection with Fig. 4 so that the ray 23 will reach the left eye L1 whereas the ray 22 will be stopped at the filter 16. The same relationship will be found to apply as well to the light rays 26—27 and 31—32.

Reference to Fig. 12 will indicate that as soon as the motion picture film is advanced one frame to project upon the screen 15 another picture of the same natural scene being taken in a different viewpoint aspect and the filter 16 has been moved to the right as viewed in Fig. 12 a distance equal to the width of one of the light polarizing elements 19, the light ray 46 will be stopped at the surface of the filter 16 and the light ray 47 will be permitted to pass through the filter.

It will be observed, therefore, that the portions 48 of the screen 15 which were previously lighted are now dark and that the portions 49 which were previously dark are now lighted by polarized light.

It will also be observed that light reflected from the portion 50 of the screen along paths 22 and 23 will strike the filter 19 at substantially the same points as previously described but that since the screen has been laterally moved a distance equal to the width of one of the light polarizing elements, the ray 22 will be allowed to pass through the filter, whereas, the ray 23 will be arrested, thus limiting the vision of the observer to the eye other than that which was permitted to view the picture under the conditions described in connection with Fig. 11.

Attention is called to the fact that the same condition obtains as regards the light rays 26—27 and 31—32 so that as there is alternately projected upon the screen 15 pictures in different stereoscopic aspects of the same natural scene or a group of objects, the observer's vision will be alternately limited to one or the other of his eyes and that due to the normal persistence of the observer's vision an impression will be created of having seen both of the stereoscopic aspects at the same time so as to thus induce a true impression of stereoscopic vision within such an observer. As has been pointed out hereinbefore, this condition obtains irrespective of where in the auditorium the observer may be located.

I have illustrated in Fig. 13 an embodiment of my invention which operates on a slightly different principle from that described in connection with the preceding modifications. The apparatus as illustrated in Fig. 13 includes, in addition to the standard motion picture projector 37 and the screen 15 and filter 16, a pair of spot lights or other light projecting means 51 and 52. These spot lights are preferably disposed as closely adjacent the objective element 38 of the projector 37 as is reasonably possible and are directed in such position as to each flood the screen 15 with light. With the spot lights 51 and 52 are associated light polarizing filters 53 and 54. These filters are disposed at right angles to each other as regards the direction of their axes of polarization.

The spot lights 51 and 52 are arranged to be eclipsed alternately and in synchronism with the alternating projecting of stereoscopically related pairs of pictures from the projector 37 as by providing for each of the spot lights 51 and 52 rotary shutters 55 adapted to be driven in synchronism with each other and with the projector 37 as by means of synchronous motors 56 coupled by means of synchronizing ties 57 to the aforementioned synchronous motor 44 which is employed to drive the projector 37. The angular positions of the shutters 55 are so adjusted that during the projection of one stereoscopic aspect through the projection lens 38, one of the spot lights, such as spot light 51, will be eclipsed, whereas, the other spot light 52 will be permitted to project light on the screen 15. This condition reverses at the time the projector operation reverses to project upon the screen 15 a picture in a different stereoscopic aspect so that with such different stereoscopic aspect the spot light 51 is permitted to flood the screen 15 with light while the spot light 52 is eclipsed.

Reference to Fig. 14 will indicate that during the projection of one of the frames of the motion picture film at which time the spot light 51 will be permitted to project light through its polarizing filter 52 upon the screen 15, a pair of rays 58 and 59 of such light will strike oppositely polarized screen elements 19a and 19b to produce upon the screen 15 a checkerboard pattern of alternate light and dark spaces resulting from the fact that the ray 59 is arrested at the filter because of striking a polarizing element 19b which is polarized in a direction opposite to the polarization of the ray 59.

It will also be observed by tracing the course of the aforementioned light rays 22—23, 26—27 and 31—32 that this pattern will be visible to but one eye of an observer located within the auditorium 10. It therefore follows that the projection of a picture by the projector 37 which is superimposed upon such a checkerboard pattern of light will also be limited as regards the observer's ability to see the picture; in other words, the picture will also be visible but to one eye of an observer.

As is shown in Fig. 15, when the positive film has been advanced one frame and the spot light 51 eclipsed while the spot light 52 is allowed to project oppositely polarized light upon the screen 15, that the pattern which is produced upon the screen will be shifted a distance substantially equal to the width of one of the light polarizing elements 19. As has been pointed out hereinbefore, this shift of the pattern causes it to be made visible to the other of the observer's eye and invisible to the first described one of the observer's eye. Similarly, the picture which is projected upon this light pattern is made visible to the other one of the observer's eyes. It follows, therefore, that an observer viewing the screen during such alternate operation of projector and spot lights will obtain a stereoscopic impression through having his vision limited to one eye in the case of one stereoscopic aspect and to the other eye in the case of another stereoscopic aspect. This condition is found to obtain when the intensity of the light which is produced on the screen 15 by the spot lights 51 and 52 is maintained at a relatively low value as compared with the intensity of the picture which is projected thereon by the projector 37.

In operation it appears that the filter 16 is opaque as regards one eye and transparent as regards the other eye during the short time that the conditions are such as diagrammatically illustrated in Fig. 14 or Fig. 15. It may be that as a matter of fact the screen is not actually opaque at this time as regards one eye, but that the degree of contrast afforded between the lighted portions of the screen and the portions of the projected picture which are visible is such as to induce the sensation in the observer that such a condition obtains. In any event, it has been found that a perfect stereoscopic impression is obtained from the operation of this last described modification of my invention in the manner hereinbefore set forth.

From the foregoing it will be observed that the stereoscopic impression which is provided for each observer depends upon the operation of the filter 16 in each of the modifications described. This filter, it will be observed, comprises a medium which is so coordinated with respect to the character of light which is projected on the screen as to pass a ray of such light extended from one point on the screen and intercept another ray which is extended from that same point and at a small angle to the first ray. As pointed out hereinbefore, this small angle is preferably defined by the width of the elements going to make up the filter and the spacing between the filter and the screen, and is preferably made substantially equal to the visual angle defined by an observer's eyes and the distance of such observer from the screen.

Attention is called to the fact that this same characteristic may be obtained by employing other types of filters comprising a plurality of filter elements arranged in a checkerboard type of pattern. I may, for example, instead of employing a light polarizing medium for these filter elements, employ transparent color filters in complementary or mutually exclusive colors, such as red and green or magenta and blue. It will be observed that if a screen is formed with alternate red and green filter elements, a ray of red light reflected from the screen may be readily passed through any one of the red filter elements, whereas, it will be totally intercepted by one of the green filter elements. This result may likewise be obtained by employing an alternated pattern of opaque and transparent elements so that a ray of light reflected from the screen will be passed through a transparent element, whereas, an adjacent ray reflected from the same point will be intercepted by an opaque element.

It will be observed that in each of the above described types of filters, they will, when employed with the remainder of the apparatus above described, serve to limit the vision of an observer in such manner that only one eye will be permitted to see the projection screen. It will also be observed that the shift of permitted visibility from eye to eye of each observer as different stereoscopic aspects are projected on the screen is obtained by either shifting the location from which the aspect is projected or by shifting the filter relative to the line of projection or by shifting the location from which a low intensity flood light is projected on to the screen.

While I have described the various forms of my invention as being directed to the employment of a filter through which is projected the light passing from the projector to the screen and through which is passed the light reflected from the screen to the observer, it will be understood that the important aspect of my invention resides in providing a single filter which is common to all observers and that images in light of the desired character may be projected on the screen either in the manner described or by employing similar filter devices in connection with a back-projection system employing a translucent screen.

It will therefore be apparent that I have provided a method and apparatus by means of which different but related stereoscopic aspects of a photographed natural scene or group of objects may be so projected as to render one of these aspects visible to one of an observer's eyes and substantially invisible to the other eye of an observer and such that another of these aspects will be oppositely visible and substantially invisible as regards the observer's eyes.

Attention is called to the fact that the above described method and apparatus operates to produce in an observer a true impression of stereoscopic vision irrespective of where the observer may be located within the theater and irrespective of the portion of the screen to which his attention may be directed.

It will be observed that the apparatus hereinbefore described permits a standard motion picture theater to be equipped with the projection of stereoscopic pictures at low cost and without requiring extensive modifications of the existing projection equipment now found in such theaters.

While I have shown and described the preferred embodiment of my invention, I do not desire to be limited to any of the details of construction shown or described herein, except as defined in the appended claims.

I claim:

1. In a stereoscopic motion picture projection apparatus, the combination of a screen; a projector for alternately projecting on said screen a stereoscopically related pair of photographic images to be observed by an observer disposed before said screen; a filter interposed between said projector and said screen and between said observer and said screen, said filter comprising a plurality of light polarizing elements disposed in side by side abutting relation with the axis of polarization of each element extended at substantially right angles to the axis of each adjacent element, said filter being spaced from said screen a distance such that the angle from a point on said screen subtended by one of said elements approximates the angle from said point which is subtended by the eyes of said observer.

2. In a stereoscopic motion picture projection apparatus, the combination of a screen; a projector for projecting on said screen from spaced points a stereoscopically related pair of photographic images to be observed by an observer disposed before said screen; a filter interposed between said projector and said screen and between said observer and said screen, said filter comprising a plurality of light polarizing elements disposed in side by side abutting relation with the axis of polarization of each element extended at substantially right angles to the axis of each adjacent element, said filter being spaced from said screen a distance such that the angle from a point on said screen subtended by one of said elements approximates the angle from said point which is subtended by said spaced projection points.

3. In a stereoscopic motion picture projection apparatus, the combination of a screen; a projector for alternately projecting on said screen a stereoscopically related pair of photographic images to be observed by an observer disposed before said screen; a filter interposed between said projector and said screen and between said observer and said screen, said filter comprising a plurality of light polarizing elements disposed in side by side abutting relation with the axis of polarization of each element extended at substantially right angles to the axis of each adjacent element, said filter being spaced from said screen a distance such that the angle from a point on said screen subtended by one of said elements approximates the angle from said point which is subtended by the eyes of said observer; and means for moving said filter in a direction parallel with said screen and in synchronism with the alternate operation of said projector a distance substantially equal to the width of said element.

4. In a stereoscopic motion picture projection apparatus, the combination of a screen; a projector for alternately projecting on said screen a stereoscopically related pair of photographic images to be observed by an observer disposed before said screen; a spotlight disposed on each side of said projector for projecting light on said screen; a light polarizing means interposed between each of said spotlights and said screen, the axes of polarization of said light polarizing means being disposed substantially at right angles to each other; and a filter interposed between said projector and said screen and between said observer and said screen, said filter comprising a plurality of light polarizing elements disposed in side by side abutting relation with the axis of polarization of each element extending at substantially right angles to the axis of each adjacent element and parallel to the axis of polarization of one of said light polarizing means, said filter being spaced from said screen a distance such that the angle from a point on said screen subtended by one of said elements approximates the angle from said point which is subtended by the eyes of said observer.

5. In a stereoscopic motion picture projection apparatus including a projector for projecting a stereoscopically related pair of photographic images to be observed by an observer, the combination of: a plane screen for receiving said images; a filter including a frame defining a plane filter area at least as great as the area of said screen and a plurality of plane light polarizing elements supported in said area in side by side abutting relation with the axis of polarization of each element extended at substantially right angles to the axis of each adjacent element; and means mounting said filter in a plane parallel to the plane of said screen and spaced from said screen a distance such that the angle from a point on said screen subtended by one of said elements approximates the angle from said point which is subtended by the eyes of said observer.

6. In a stereoscopic motion picture projector apparatus including a projector for projecting a stereoscopically related pair of photographic images to be observed by an observer, the combination of: a plane screen for receiving said images; a filter area defined by a plurality of adjacently disposed light polarizing elements, each disposed with its axis of polarization extended at substantially right angles to the axis of polarization of each adjacent element; and means mounting said filter in a plane parallel to the plane of said screen and spaced from said screen a distance such that the angle from a point on said screen subtended by one of said elements approximates the angle from said point which is subtended by the eyes of said observer.

FLOYD H. WILLIS.